Aug. 31, 1937.　　　　　J. SHOPE　　　　　2,091,742
PAINT BRUSH HOLDER
Filed July 1, 1936　　　2 Sheets-Sheet 1

Inventor
John Shope
By Clarence A. O'Brien
Hyman Berman
Attorneys

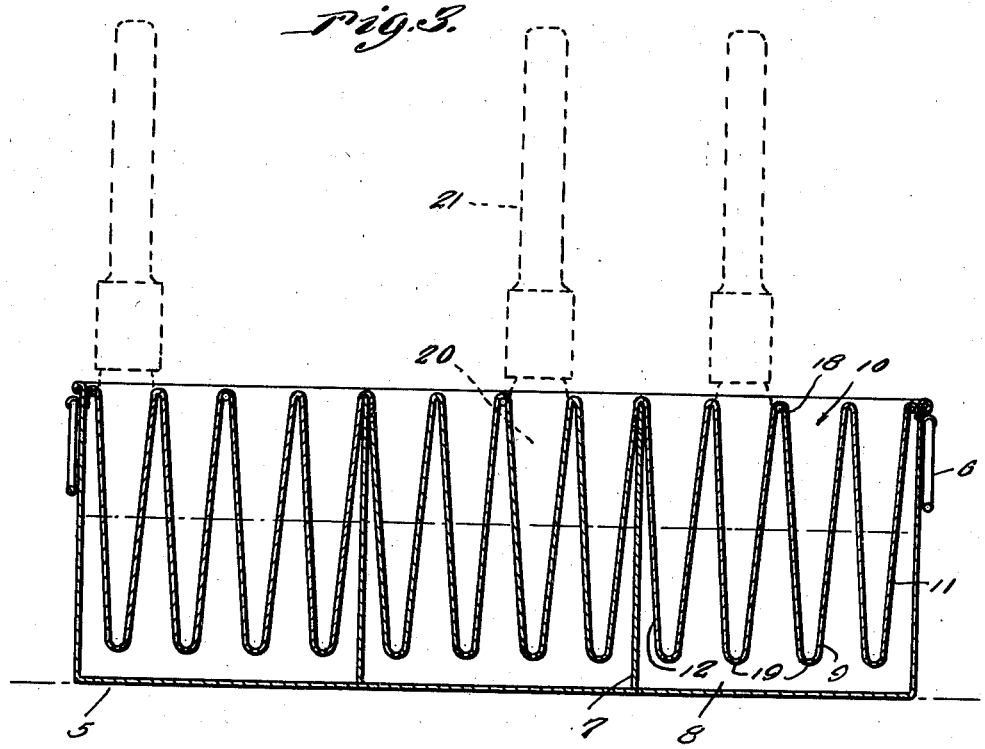
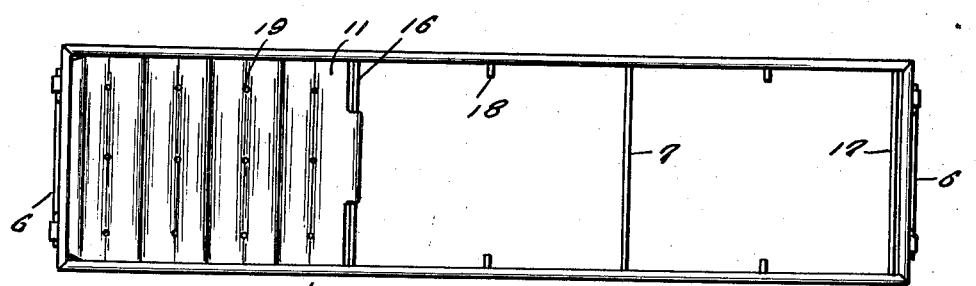

Patented Aug. 31, 1937

2,091,742

UNITED STATES PATENT OFFICE 2,091,742

PAINT BRUSH HOLDER

John Shope, Cuyahoga Falls, Ohio

Application July 1, 1936, Serial No. 88,489

1 Claim. (Cl. 206—15.1)

The present invention relates to holders for paint brushes and has for its primary object to provide a pan for containing a suitable liquid to maintain the brushes in a softened condition and also to provide a series of individual receptacles or molds removably positioned in the pan and within which the bristle ends of the brushes are supported to maintain the same in their proper shape.

An important object of the invention is to provide a pan having individual liquid compartments each having a group of brush holding members suspended therein and providing for the selective removal of each group of brush holding members independent of the others.

A further object is to provide a device of this character of durable construction, in which the several removable brush holding elements are interchangeable, which is practical and economical in use and otherwise well adapted for the purposes for which the same is intended.

Other objects and advantages reside in the special details of construction and operation as more fully hereinafter described and claimed, reference being had to the accompanying drawings forming a part hereof and wherein:—

Figure 2 is a vertical transverse sectional view thereof.

Figure 3 is a vertical longitudinal sectional view thereof.

Figure 4 is a top plan view and

Figures 5 and 6 are end elevational views of the respective opposite ends of the removable brush holding elements.

Figure 1:
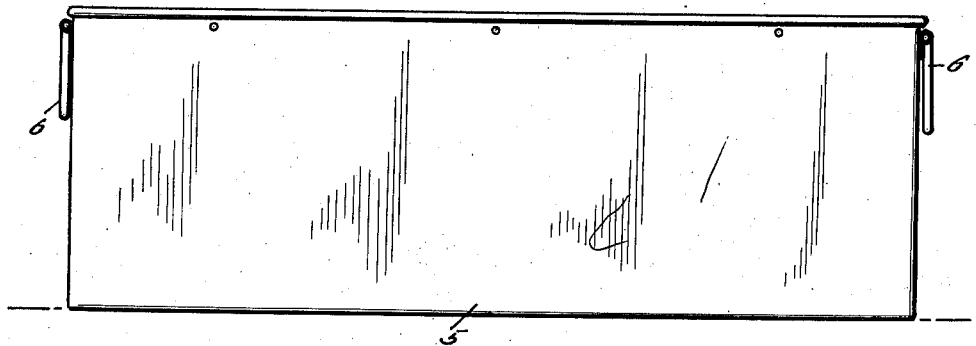
Figure 1 is a side elevational view of the pan.
Figure 1:
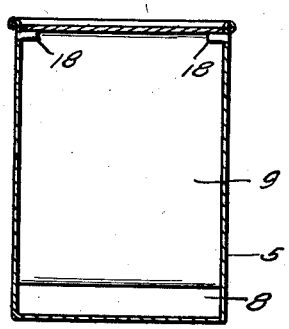
Figure 1:
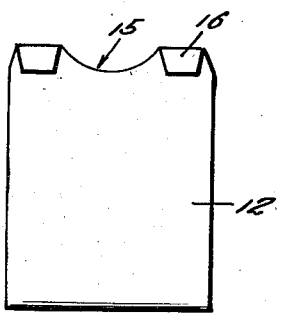
Figure 1:
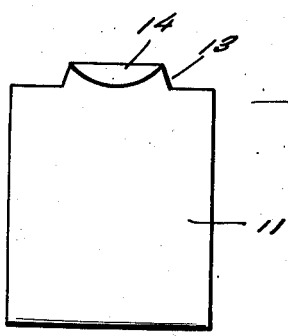

Referring now to the drawings in detail wherein for the purpose of illustration I have disclosed the preferred embodiment of the invention, the numeral 5 designates a pan, preferably of metal, open at its top and having handles 6 at each end thereof. The pan preferably is of rectangular formation and provided with upstanding transversely extending partitions 7 dividing the pan into a series of individual compartments 8.

Within each of the compartments is arranged a brush holding element designated generally by the numeral 9 each of said members being of identical construction, and formed of a strip of relatively thin metal bent transversely to provide a series of troughs 10 tapering toward their lower ends, as more clearly illustrated in Figure 3 of the drawings.

The respective opposite ends 11 and 12 of the brush holding members terminate with their upper edges extending upwardly, said end section 11 being more clearly illustrated in Figure 6 of the drawings and is formed with a central extension 13 bent downwardly upon itself as indicated at 14 to form a hook for suspending the member on the upper edge of the partition 7. The other end section 12 is more clearly illustrated in Figure 5 of the drawings and has its central upper edge notched as indicated at 15 and a pair of tongues 16 adjacent each side edge of the said end section and bent downwardly to also suspended said end of the member upon the upper edge of the partition 7, as will be apparent from an inspection of Figure 4 of the drawings. It will be understood from the foregoing that the notched section 15 of the end section 12 serves to accommodate the upstanding extension 13 and hook 14 of the end section 11 of the adjoining brush holding member so that the adjoining end sections of a pair of the brush holding members may be supported upon a single partition and each removed therefrom without interference.

Within each end of the pan 5 is positioned a transversely extending rod 17 adjacent the upper edge of the pan and on a plane with the upper edge of the partition 7. These rods serve to form supports for one of the end sections of the brush holding members in the same manner as the partitions 7. Pegs 18 are also extended inwardly from opposite sides of each compartment of the pan, adjacent their upper edges and upon which an upper edge portion of the brush holding member is suspended to prevent sagging of the intermediate portion of said members. The bottom of each trough 10 of the brush holding members are provided with perforations 19 and the bottom edge of said brush holding members are suspended above the bottom of the pan so that any sediment accumulating in the trough will drain into the pan.

From the foregoing it will be apparent that each of the troughs 10 are capable of receiving the bristle 20 of a paint brush 21 and the tapering formation of the trough corresponds substantially to the tapering shape of the bristles and thus serves to maintain the bristles in a normal compressed condition. Likewise, the perforations 19 in the bottom of each trough permits fluid placed in the pan to enter the trough and maintain the bristles of the brush in a softened condition.

While I have disclosed a perferred embodiment of my invention it is to be understood that numerous changes in the shape, size and materials may be resorted to without departing from the spirit and scope of the invention as claimed hereinafter.

Having thus described the invention, what is claimed as new is:—

In combination, an elongated receptacle having vertical transversely extending partitions therein, said partitions dividing the interior of of the receptacle into chambers, a multiple troughed units for each chamber adapted to support a plurality of paint brushes, each of said units being provided with a pair of hook members at one end for engaging one end wall of the receptacle or one of the partitions and a single hook member at its opposite end for engaging over one of the end walls or a partition, the single hook members being adapted for disposition between the pairs of hook members on adjacent units in engaging over corresponding partitions.

JOHN SHOPE.